US006978128B1

(12) United States Patent
Raman et al.

(10) Patent No.: US 6,978,128 B1
(45) Date of Patent: Dec. 20, 2005

(54) SYSTEM AND METHOD TO ALLOW SIMPLE IP MOBILE NODES TO OPERATE SEAMLESSLY IN A MOBILE IP NETWORK WITH TRUE ROAMING CAPABILITIES

(75) Inventors: Sundar Raman, Arlington Heights, IL (US); Chandra Warrier, Schaumburg, IL (US); Ningya Wang, Schaumburg, IL (US)

(73) Assignee: UTStarcom, Inc., Alameda, CA (US)

( * ) Notice: Subject to any disclaimer, the term of this patent is extended or adjusted under 35 U.S.C. 154(b) by 526 days.

(21) Appl. No.: 09/849,834

(22) Filed: May 4, 2001

(51) Int. Cl.⁷ .............................. H04L 9/00; H04L 9/32; G06F 11/30
(52) U.S. Cl. ...................... 455/414; 455/412; 455/413; 455/417; 455/403; 455/410; 455/411
(58) Field of Search ................. 455/412, 413, 455/414, 417, 403, 410, 411, 433; 370/229, 370/328, 856

(56) References Cited

U.S. PATENT DOCUMENTS

| | | | |
|---|---|---|---|
| 6,466,964 B1 * | 10/2002 | Leung et al. ............... 709/202 |
| 6,512,754 B2 * | 1/2003 | Feder et al. ............... 370/338 |
| 6,608,832 B2 * | 8/2003 | Forslöw ...................... 370/353 |
| 6,622,016 B1 * | 9/2003 | Sladek et al. .......... 379/201.01 |
| 6,684,256 B1 * | 1/2004 | Warrier et al. .............. 709/238 |
| 6,707,809 B1 * | 3/2004 | Warrier et al. .............. 370/351 |
| 6,760,444 B1 * | 7/2004 | Leung ........................ 380/270 |
| 6,795,705 B1 * | 9/2004 | Warrier et al. ........... 455/435.1 |
| 2002/0066036 A1 * | 5/2002 | Makineni et al. | |

OTHER PUBLICATIONS

G. McGregor, "*The PPP Internet Protocol Control Protocol (IPCP)*", Network Working Group, RFC 1332, May 1992, pp. i-12.
C. Perkins, "*IP Mobility Support*", Network Working Group, RFC 2002, Oct. 1996, pp. 1-79.
Rigney et al., "*Remote Authentication Dial In User Service (RADIUS)*", Network Working Group, RFC 2138, Apr. 1997, pp. 1-65.
Declaration for U.S. Appl. No. 09/849,834, filed on May 4, 2001.

* cited by examiner

*Primary Examiner*—Allan Hoosain
(74) *Attorney, Agent, or Firm*—McDonnell Boehnen Hulbert & Berghoff LLP (57) ABSTRACT

A system and method of transmitting information between a mobile node and a home agent of the mobile node. The mobile node has an associated home AAA server. The address of the HAAA is determined. The HAAA is contacted and, responsively, receives information indicating a methodology of determining the home address of the mobile node. A proxy server determines the address of the home agent using information received from the PDSN. The information is routed from the mobile node to the home agent having the address.

18 Claims, 6 Drawing Sheets

SYSTEM AND METHOD TO ALLOW SIMPLE IP MOBILE NODES TO OPERATE SEAMLESSLY IN A MOBILE IP NETWORK WITH TRUE ROAMING CAPABILITIES

FIELD OF THE INVENTION

This present invention relates to allowing a mobile node, which is transmitting a data message to a destination device, to move between networks.

BACKGROUND OF THE INVENTION

Mobile nodes, which have become widely used in society today, may take a variety of forms. For example, the mobile node may be a cellular phone or personal communication service (PCS) device.

A mobile node may be coupled directly or indirectly to a wireless network. In turn, the wireless network may be directly or indirectly coupled to another device. The mobile node may wish to communicate with this other device.

The mobile node may be also coupled to a user device. The user device may be any device that is capable of transmitting and/or receiving any type of information. For instance, the user device may be a personal digital assistant (PDA) or a personal computer. Other types of user devices are possible.

Mobile nodes may travel within a "home" network and travel to other ("foreign") networks. Wherever the mobile node is located, other users and entities may need to send information to the mobile node and the mobile node may desire to send information to these other users and entities.

In order to determine the location of the mobile node (and transfer the information), the mobile node may be given a permanent address ("home address") on the home network. When away from its home network, the current address ("care-of address") associated with the mobile node may reflect the mobile node's current point of attachment within the foreign network. The mobile node may use its home address as the source address of all information, for example, IP datagrams that the mobile node sends or receives from other users or entities.

To facilitate the transfer of information between the mobile node and other users and entities, the home network may include a home agent. The home agent may perform several functions. For example, the home agent may maintain information concerning the mobile node, for instance, the current location of the home device. In another example, when another user or entity desires to communicate with the mobile node, the home agent may act as a router and "tunnel" information to the mobile node (when the mobile node is attached to a foreign network).

The foreign network may include a foreign agent, which may also perform several functions. For example, when a mobile node moves to the foreign network, the mobile node may contact the foreign agent. In one illustrative example, the foreign agent may be a router on the foreign network and provide routing services to the mobile node while the mobile node is registered on the foreign network. The foreign agent may also "detunnel" and deliver information to the mobile node that was tunneled by the mobile node's home agent.

Home agents and foreign agents may advertise their availability on each network for which they provide service. A newly arrived mobile node may send a solicitation on the foreign network to learn if any prospective foreign agents are present. When the mobile node is away from its home network, it may register its care-of address with its home agent. Depending on its method of attachment, the mobile node may register either directly with its home agent, or through a foreign agent, which forwards the registration to the home agent.

Upon the traversal of a serving area by a mobile node, the mobile node must register with a new foreign agent. Transfer of session from one foreign agent to another may be performed using a proxy server to re-establish the mobile node user's profile information, and the home agent to re-establish the connection profile for the session.

SUMMARY OF THE INVENTION

The system and method of the present invention advantageously allows a mobile node to transmit data to a user device while moving between networks. Conveniently, the address of the home agent of the mobile node may be determined by using a proxy server, no matter where the mobile node is located.

In one embodiment of the present invention, a mobile node is coupled to a proxy server. The mobile node may have a home agent and an associated home administration, authorization, and authentication (HAAA) server.

The proxy server may determine the address of the HAAA. The proxy server may contact the HAAA and, responsively, may receive information indicating a methodology to determine the address of the home agent of the mobile node. The proxy server may determine the address of the home agent using information received from the HAAA. Information may then be routed from the mobile node to the home agent having the address. Thereafter, if the mobile node moves to a different network, the above procedure may be repeated and connectivity with the home agent will not be lost.

In another embodiment of the present invention, a mobile node is coupled to a wireless network. A PDSN is also coupled to the wireless network and a proxy server is coupled to the PDSN. A HAAA server is coupled to the proxy server and a home agent is coupled to the PDSN.

The mobile node may send a request message to the wireless network, and the wireless network may send the request message to the PDSN. The PDSN may forward the request message to the proxy server. The proxy server may have a table and PDSN may determine the address of the HAAA from the table. The HAAA may be contacted and may send information representative of an IP address assignment to the proxy server. The proxy server may determine the address of the home agent based upon the information. The message may thereafter be routed to the home agent having the address.

In another embodiment of the invention, upon the traversal of the mobile node between packet data serving areas, the proxy server may determine that the mobile node has 'roamed', or traversed to a new packet data serving node or foreign agent, and may explicitly reclaim any resources (perform "resource allocation") affiliated with the original session on the original foreign agent. The mechanism of resource management may be performed in conjunction with reclaiming resources allocated to the original session on the home agent. Reclaiming of resources from the original foreign agent by the proxy server may be performed using resource-management messages following the RADIUS protocol for communication. Management of resources on the home agent by the foreign agent may be triggered by the completion of the resource reclamation procedure between the proxy server and the foreign agent, and may follow the mobile IP de-registration procedures.

These as well as other features and advantages of the present invention will become apparent to those of ordinary skill in the art by reading the following detailed description, with appropriate reference to the accompanying drawings.

BRIEF DESCRIPTION OF THE DRAWINGS

Preferred embodiments of the present inventions are described with reference to the following drawings, wherein.

DETAILED DESCRIPTION OF PREFERRED EMBODIMENTS

Figure 1:
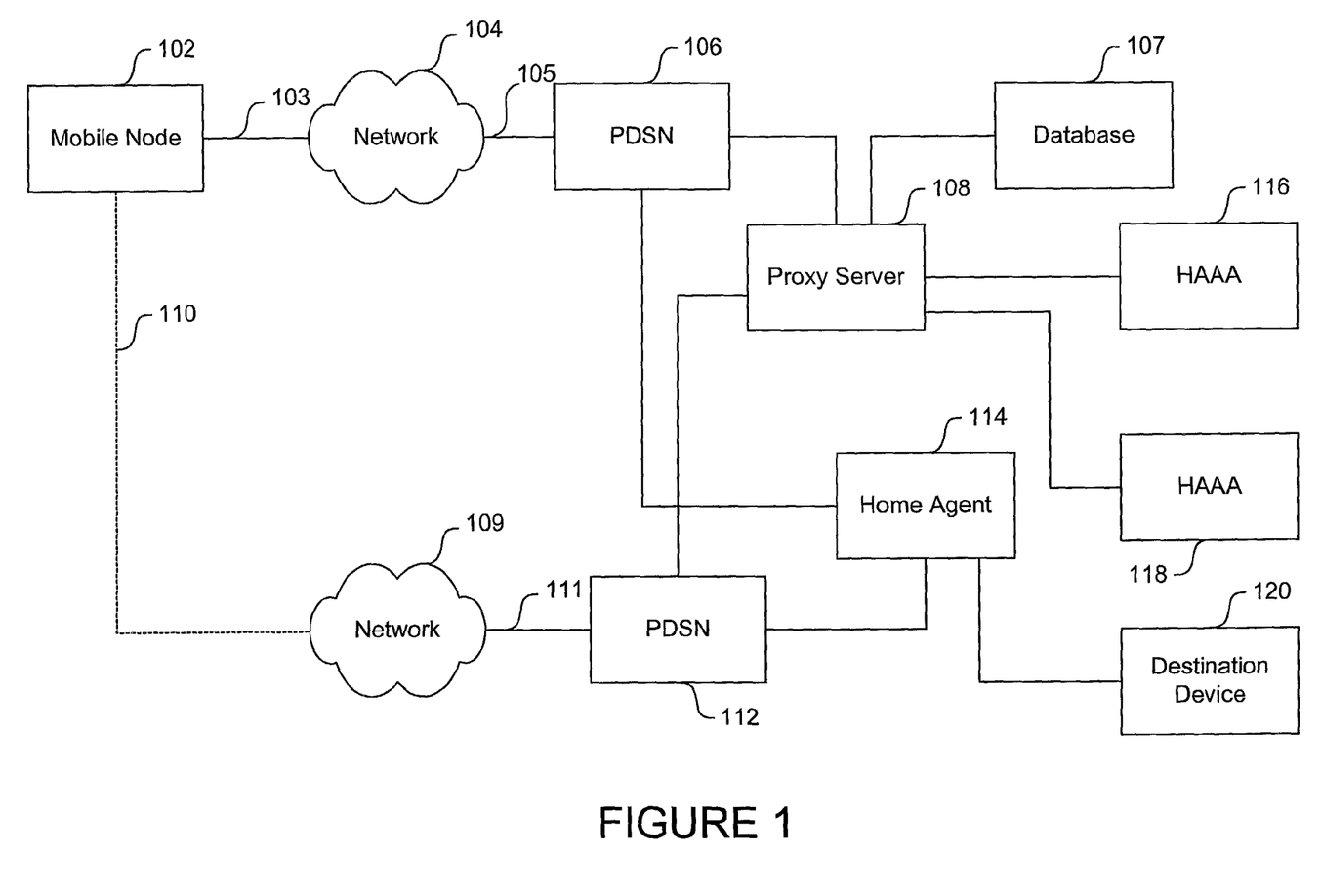
FIG. 1 is a diagram illustrating a preferred embodiment of the system for transmitting data to a home agent in accordance with the present invention.

Referring to FIG. 1, a system includes a mobile node 102, a first network 104, a second network 109, a first packet data serving node (PDSN) 106, a second PDSN 112, a proxy server 108, a home agent 114, a first home administration, authorization, and authentication (HAAA) server 116, a second HAAA server 118, and a destination device 120. A database 107 may be coupled to the proxy server 108.

The mobile node 102 may be coupled to the network 104 via a connection 103 or to the network 109 via the connection 110. The network 104 may be coupled to the PDSN 106 via a connection 105 and the network 109 may be coupled to the PDSN 112 via a connection 111. The PDSN 106 and the PDSN 112 may be coupled to the proxy server 108 and the home agent 114. The proxy server 108 is coupled to the HAAA 116 and the HAAA 118. The home agent 114 is coupled to the destination device 120.

The mobile node 102 is any type of mobile wireless device. For example, the mobile node may be a cellular telephone, a PCS device, or a personal digital assistant (PDA). Of course, other types of mobile nodes are possible.

The networks 104 and 109 may be an IS-95/CDMA or CDMA2000 wireless network. For example, the network may be a wireless cellular communication network. The networks 104 and 109 may also include a variety of devices such as base stations, MSCs, and switches. Of course, the networks 104 and 109 may include other devices, as well.

The first PDSN 106 and the second PDSN 112 may aggregate traffic from the networks 104 and 109 and provide a path for this traffic to a data network. In one example, the PDSN 106 and PDSN 109 may be CommWorks Corporation Packet Data Serving Node. Of course, other examples of PDSNs are possible.

The functions of the proxy server 108 may be implemented by a processor using computer instructions stored in a memory. The proxy server 108 may determine the address of the home agent 114 so that as the mobile node 102 moves between networks 104 and 109, connectivity between the mobile node 102 and the destination device 120.

The home agent 114 may be any server that has home agent capabilities. In one example, the home agent 114 is a home agent manufactured by CommWorks Corporation. The home agent 114 tunnels information from the mobile node 102 to the destination device 120.

The first HAAA server 116 and the second HAAA server 118 may be any type of HAAA server. In one example, the first HAAA server 116 and the second HAAA server 118 may be a Funk Software Steel Belted RADIUS server.

In one example of the operation of the network of FIG. 1, the mobile node 102 having a domain address (e.g., ABC.com) may establish a session with the network 104 and the PDSN 106. For example, LPC negotiations may be performed to establish the session.

The PDSN 106 may send an access-request message, for example, a CHAP access-request message to the proxy server 108. The proxy server 108 may determine a HAAA server 116 or 118 based upon the domain address. For example, as described elsewhere in this specification, the proxy server may use a table to find the address of the HAAA relating to the domain address. The proxy server 108 may send the access-request message to the HAAA 116.

The HAAA 116 may return an access-accept message to the proxy server. The access-accept message may include an indication of the methodology to be used to determine the home address of the mobile node 102. For example, the indication of methodology may indicate that the proxy should use a static address for the home address as assigned by the HAAA or consult a local address pool ("dynamic addressing") to determine the home address of the mobile node. In the case of a static address, a fixed address (e.g., 10.10.10.10) may be used to indicate that the home address of the mobile node is fixed, and provided by the HAAA. This value is provided in the IP address attribute of an access-accept message. In the case of dynamic addressing, the absence of the IP Address attribute, or the existence of a predetermined IP address (e.g. 255.255.255.254) may be used to instruct the proxy to use an address pool to find the address of the home agent.

In addition to the home address for the mobile node, the proxy may assign a home agent address. The value may be provided in the Next-Hop-Gateway attribute of the access-accept message. The value may be indicated by the HAAA. The absence of the attribute indicates to the proxy that it should select a home agent address for the request based on request parameters (for e.g. the domain name). Of course other indications of methodology and other methodologies are possible.

The proxy server 108 may receive the message and from the indication of methodology determine the address of the home agent 114. This address may be passed to the PDSN 106. The PDSN 106 then may route all messages from the mobile node 102 through the home agent 114 to the destination device 120.

If the mobile node 102 moves to the network 109 (via connection 110), a teardown procedure may be performed. Thereafter, the same procedure as described above may be used to establish a connection to a home agent 114, this time via the PDSN 112.

Figure 2:
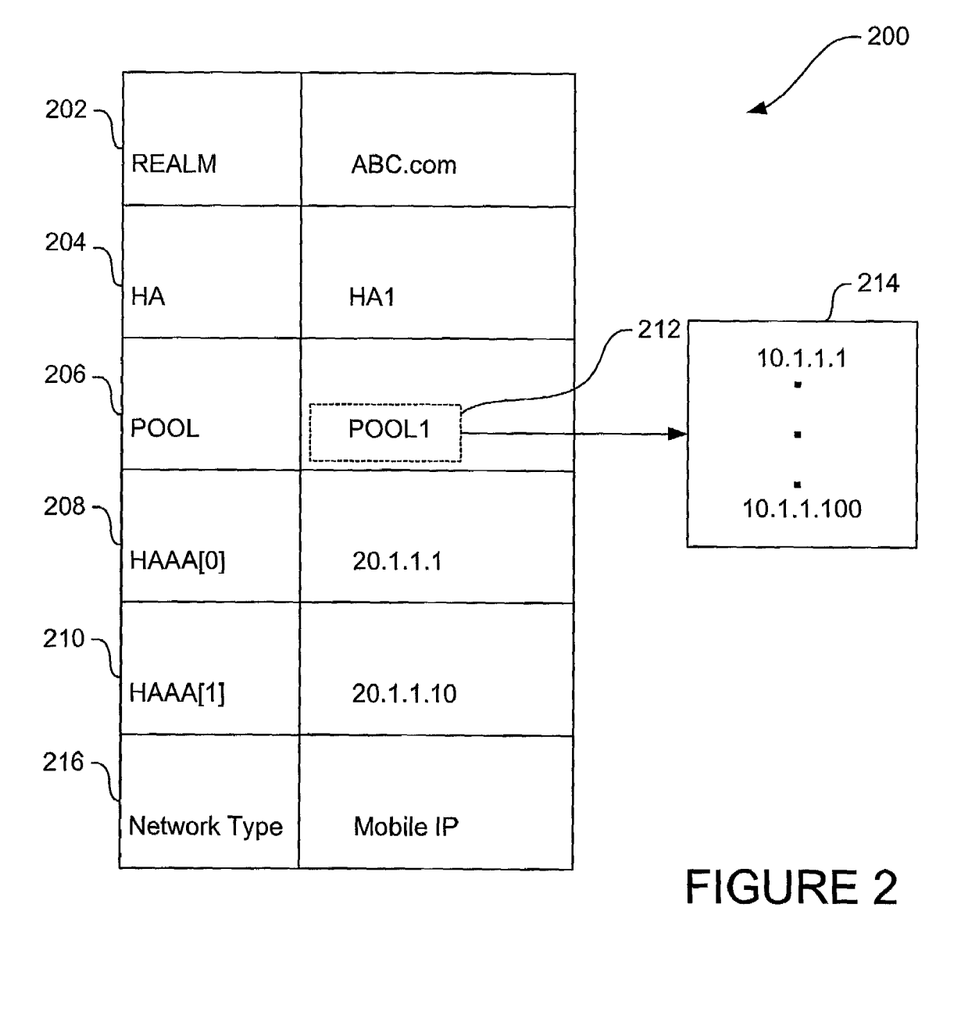
FIG. 2 is one example of a table used by the proxy server in accordance with a preferred embodiment of the present invention.

Referring now to FIG. 2, one example of a table used by a proxy server is described. A table 200, has a realm entry 202. In this case, the realm entry is ABC.com. The table also has a home agent entry 204. In this case, the entry indicates the address of the home agent, HA1. HA1 may itself be a pointer to the actual address, for example, "10.1.1.1".

The table 200 also has a pool entry 206, which is "POOL1." POOL1 points to an address pool 214, which includes a plurality of home agent addresses. The table also includes a preferred HAAA entry 208 and a secondary HAAA entry 210, which have addresses of 20.1.1.1 and 20.1.1.10, respectively. The table 200 also includes a network type field 216, which is set to "Mobile IP". The field could also have values of "Simple IP", or "Mobile Proxy Agent". Of course, there may be other fields in the table and additional entries for different realms.

Figure 3:
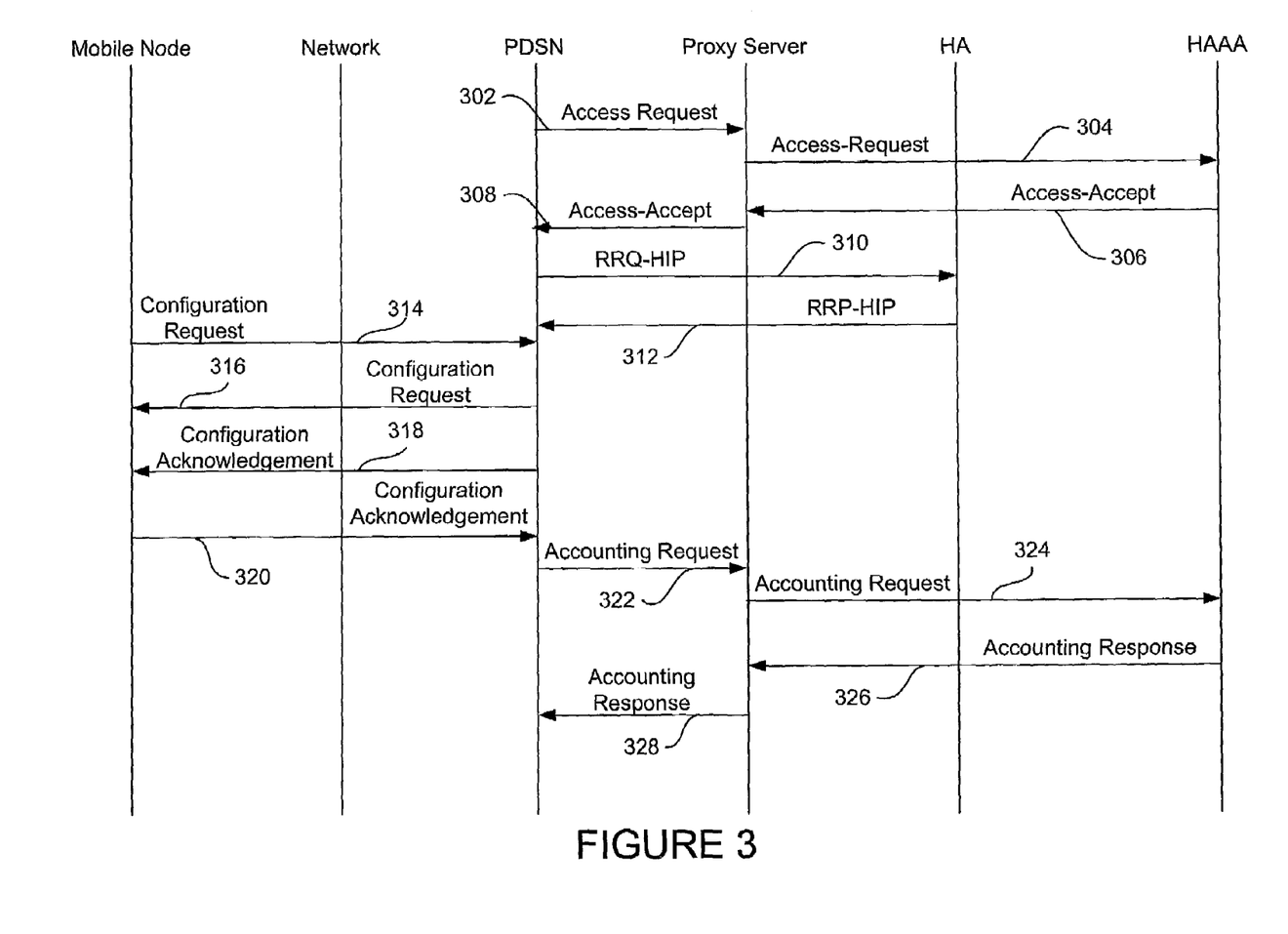
FIG. 3 is a call-flow diagram illustrating setting up a connection in accordance with a preferred embodiment of the present invention.

Referring now to FIG. 3, one example of a session set-up procedure is described. This example describes communications between a mobile node, network, PDSN, proxy server, home agent (HA) and HAAA coupled together as illustrated in FIG. 1.

At step 302, an access-request message, for example an access-request message conforming to the CHAP protocol, is sent from the PDSN to the proxy server. At step 304, the proxy server determines that there is no existing session (from information in its database), selects a HAAA server, and sends the access-request message to the HAAA server.

At step 306, the HAAA server sends a access-accept message to the proxy server. For example, the message may contain information indicative of the methodology that the proxy server may use to determine the home address of the mobile node. In addition, the message may include, the framed IP address, framed compression type, and frame protocol.

At step 308, the proxy server selects an address of the home agent (based upon the information indicative of methodology) and creates a session. A session is defined by a record inserted into a database (either local or network accessible) which stores the user's connection information. The proxy server sends an access-accept message, for example, including the IP address of the home agent, to the PDSN.

At step 310, the PDSN sends a request to set up a link to the home agent. The request, for example, may be in the form of a registration request (RRQ) message according to the Mobile IP protocol as defined in RCF2002. The message may include the address of the home agent and other information.

At step 312, the home agent sends a response to the request (at step 310) indicating that the link can be set-up. The response, for example, may be in the for of a registration response (RRP) message according to the Mobile IP protocol. The response message is an acknowledgement of receipt of the request.

At step 314 a configuration request message is sent from the mobile node to the PDSN. In one example, the configuration request message may be in the form of a IPCPConfigRequest message according to the IPCP protocol defined in RFC1332. The purpose of the configuration request message is to open a connection for communication between the mobile node and the PDSN.

At step 316 a configuration request message is sent from PDSN to the mobile node. In one example, the configuration request message may be in the form of an IPCConfigRequest message according to the IPCP protocol. The purpose of this configuration request message is to open a IP connection for communication between the PDSN and the mobile node.

At step 318, the PDSN sends a configuration acknowledgment in response to the configuration request message sent at step 314. For example, the configuration acknowledgement message may be a IPCPConfigack message according to the IPCP protocol and include the IP address assigned to the user. The purpose of the configuration acknowledgement message is to provide an indication of receipt and acceptance of the connection request from the mobile node.

At step 320, the mobile node sends a configuration acknowledgment in response to the configuration request message sent at step 316. For example, the configuration acknowledgement message may be an IPCPConfigack message according to the IPCP protocol. The purpose of the configuration acknowledgement message is to indicate acceptance of the connection request from the PDSN.

At step 322, the PDSN sends an accounting request message to the proxy server. The purpose of the message is initial transmission of billing information. The accounting message may be a start message according to the RADIUS protocol.

At step 324, the proxy server forwards the accounting request message to the HAAA server. The accounting message may be a start message according to the RADIUS protocol.

At step 326, the HAAA sends an accounting response message to the proxy server. The purpose of the response message is acknowledgement of receipt of the accounting request message. The accounting response message is sent according to the RADIUS protocol.

At step 328, the proxy server forwards the accounting response message to the PDSN. The purpose of the response message is acknowledgment of receipt of the accounting request message. The accounting response message is sent according to the RADIUS protocol.

Figure 4:
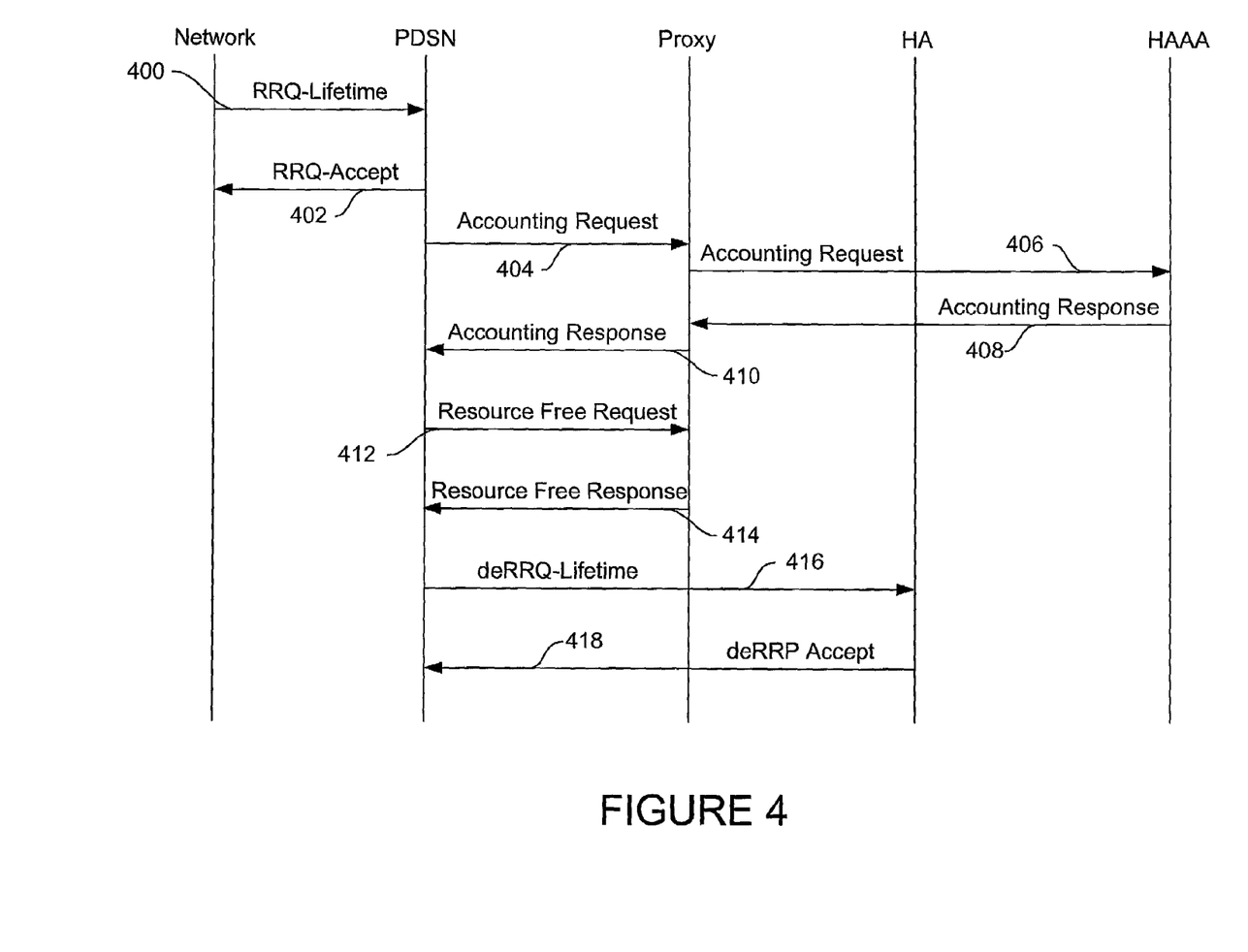
FIG. 4 is a call-flow diagram illustrating tearing down a connection in accordance with a preferred embodiment of the present invention.

Referring now to FIG. 4, a teardown procedure is described. This example describes communications between a network, PDSN, proxy server, home agent (HA) and HAAA coupled together as illustrated in FIG. 1.

At step 400, the network sends the PDSN a RRQ-lifetime message, which requests that the connection between the mobile and the home agent be torn down. At step 402, the PDSN responds by sending a RRQ-Accept message to the network, which informs the network that the request to tear down the connection has been accepted.

At step 404, the PDSN sends an accounting request message to the proxy server. The purpose of the message is to indicate termination of the billing session. The accounting message may be a stop message according to the RADIUS protocol.

At step 406, the proxy server forwards the accounting request message to the HAAA server. The purpose of the message is to notify the HAAA of the accounting session termination. The accounting message may be a stop message according to the RADIUS protocol.

At step 408, the HAAA sends an accounting response message to the proxy server. The purpose of the response message is acknowledgement of receipt of the accounting request message. The accounting response message is sent according to the RADIUS protocol.

At step 410, the proxy server forwards the accounting response message to the PDSN. The purpose of the response message is acknowledgement of the accounting request message. The accounting response message is sent according to the RADIUS protocol.

At step 412, the PDSN sends a Resource Free Request message to the Proxy server. The purpose of the message is clean up and removal of active session information from the proxy's session database. The message is formatted according to the RADIUS protocol.

At step 414, the proxy server responds with a Resource Free Response message that is sent to the PDSN. This response message is formatted according to the RADIUS protocol.

At step 416, the PDSN sends a deRRQ-Lifetime message to the home agent. The message may be according to the Mobile IP protocol. The purpose of this message is removal of any active session information on the home agent.

At step 418, the home agent responds with a deRRP Accept message that it sends to the PDSN. The message may be according to the Mobile IP protocol. The purpose of this message is acknowledgement of the request message. At this point, the session has been torn down.

Figure 6:
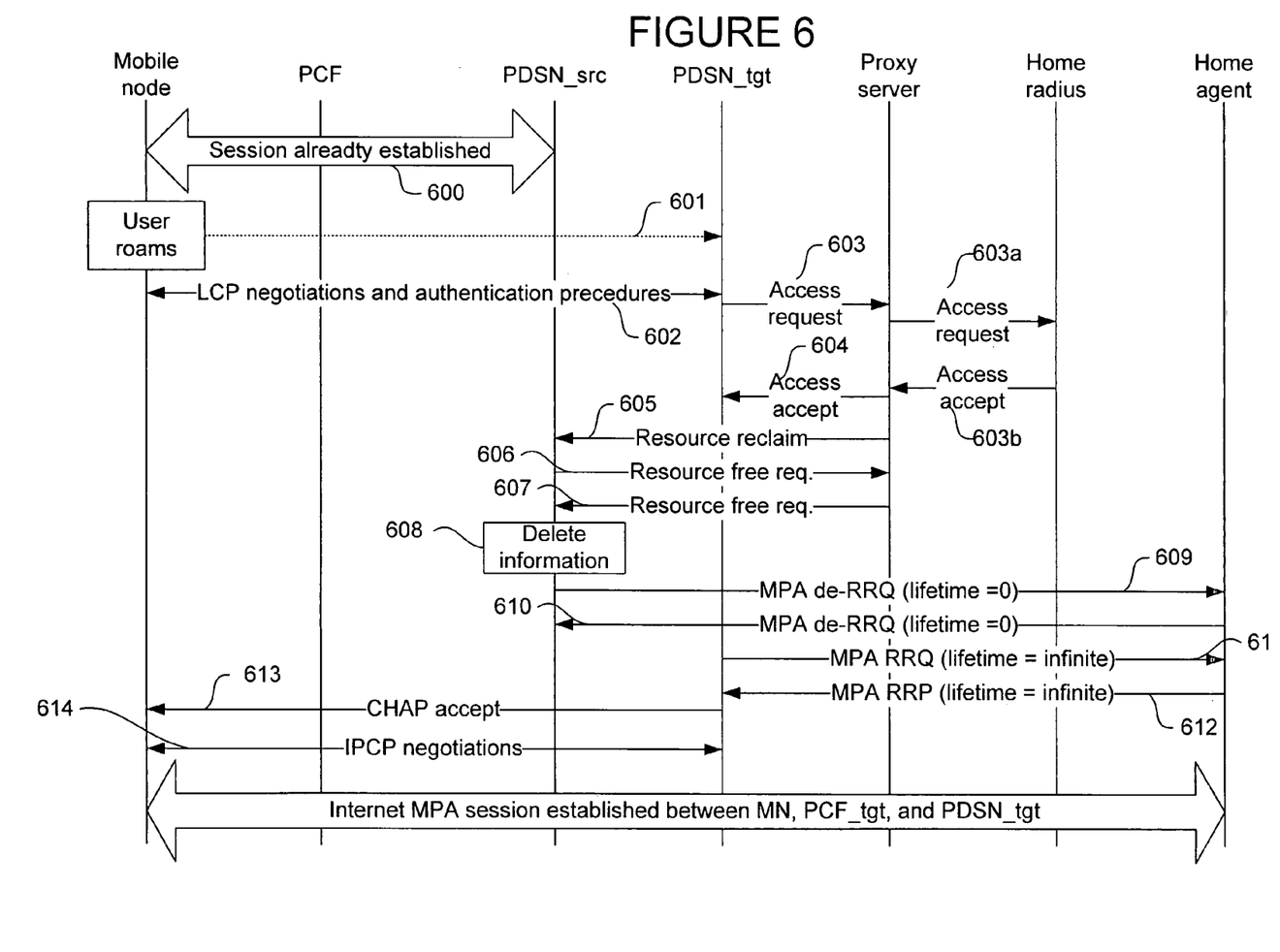
FIG. 6 is a call-flow diagram illustrating resource allocation in accordance with a preferred embodiment of the present invention.

Referring now to FIG. 6, one example of a transfer of session from one foreign agent to another due to traversal of a packet data serving area is described. In FIG. 6, a mobile node ("MN") moves from a first PDSN ("PDSN_src") to a second PDSN ("PDSN$_{13}$ tgt"). The MN has a home agent, a home radius server, and a proxy server associated with it.

At step 600, the mobile node has an active connection established with the PDSN_src, as has been described elsewhere in this specification.

At step 601 the mobile node has traversed from the packet data serving area covered by the PDSN_src to the area covered by the PDSN_tgt. At step 602, the mobile node may attempt to establish a new connection with the PDSN_tgt, by initiating LCP negotiations and authentication procedures. At step 603, the PDSN_tgt may send an access-request message for authentication to the proxy server. The proxy server may communicate the authentication request to the home AAA server at step 603a and receive an access-accept message at step 603b.

At step 604, the proxy server may accept the request for authentication by the PDSN_tgt by sending an access-accept message to the PDSN_tgt.

At step 605, the proxy server may be triggered (by the request for authentication from the traversing mobile node) to reclaim the resources that remain from the original session on the PDSN_src, prior to traversal. The request for resource-reclaim may be acknowledged by the PDSN_src in step 606 with a resource-free-request. The proxy server may respond to the request with a resource-free-response in step 607. Messages for steps 603, 604, 605, 606, 607, and 608 may be formatted according to the RADIUS protocol.

At step 608, the PDSN_src may delete all information about the session from its Visitor List databases. At step 609, the PDSN_src may send a de-registration request (de-RRQ) for example, with lifetime=0, to the home agent. The message may be according to the Mobile IP protocol. The purpose of this message is removal of any active session information on the home agent.

At step 610, the home agent may respond with a de-registration response (de-RRP) message that it may send to the PDSN_src. The message may be according to the Mobile IP protocol. The purpose of this message is acknowledgement of the request message.

At step 611, the PDSN_tgt may send a RRQ message in order to establish a registration with the home agent. The RRQ may have a non-zero or infinite lifetime. At step 612, the home agent may respond with a RRP message, indicating acknowledgement of the request.

At step 613, a CHAP accept message may be sent from the PDSN_tgt to the mobile node. The purpose of this message is to indicate to the mobile node that authentication was completed successfully. At step 614, IPCP negotiations take place between the mobile node and the PDSN_tgt. The purpose of these negotiations is to establish an IP communication connection between the mobile node and the PDSN. At this point, the session has been torn down on the PDSN_src, and the session has been actively transferred to the PDSN$_{13}$ tgt.

Figure 5:
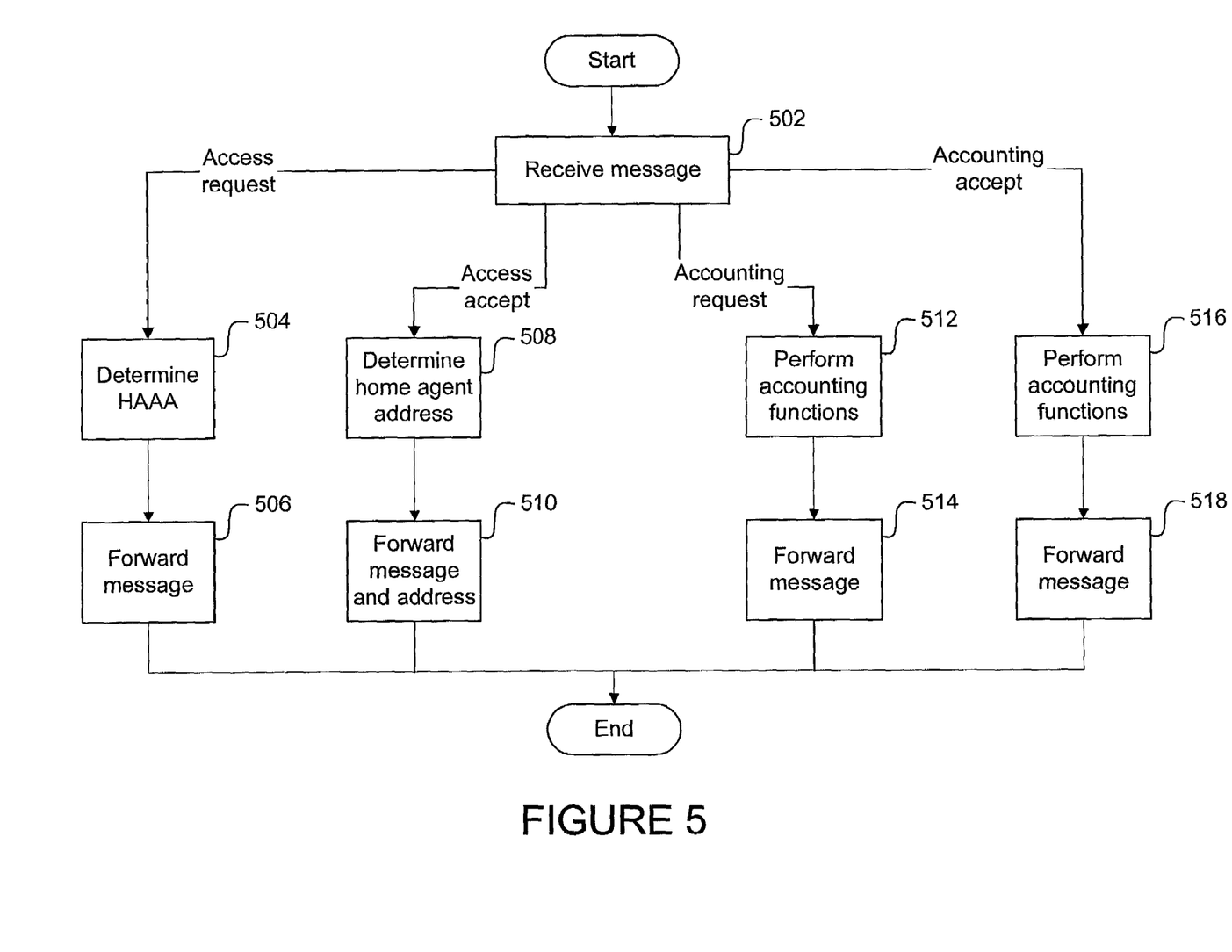
FIG. 5 is a flow chart of the operation of the proxy server in accordance with a preferred embodiment of the present invention.

Referring now to FIGS. 2 and 5, one example of the operation of a proxy server is described. At step 502, the proxy server receives the message from an outside entity (e.g., the PDSN or the HAAA) and determines the type of message.

If the type of message is an access-request, then at step 504, the proxy server determines the address of the HAAA using a table stored at the proxy server. For example, assuming that the message includes a domain name of "ABC.com", the proxy server may look at a table of FIG. 2 and determine that, as a first choice, the HAAA has an address is 20.1.1.1. At step 506, the access-request message is passed to the HAAA with the address of 20.1.1.1. Execution then ends.

If the type of message is an access-accept, then at step 508, the proxy server determines the home address of the mobile node. In order to determine the address, the proxy server examines the access-accept message. In one example, the access-accept message includes a field, which indicates the methodology the proxy server may use to determine the home address of the mobile node. For example, if the field IP Address exists and contains an IP address assigned by the HAAA, the proxy server may use the address proposed. In another example, the field may not exist, or may have a magic IP address value (e.g. 255.255.255.254). This indicates to the proxy server to find an address from a pool. The proxy server may consult its table and find the pool, then find an address from the pool. The proxy server may also assign a home agent address for the mobile node. The home agent address may be determined from the domain name (ABC.com). The home agent address then may be sent in the Next-Hop-Gateway field of the access-accept message. Of course, other methodologies may be indicated and other methods of determining the address are possible. At step 510, the proxy server forwards the access-accept message and address to the PDSN. Execution then ends.

If the type of message is an accounting request, then at step 512, the proxy server may perform no processing except to generate a message to be forwarded, and the proxy server passes the message to another entity. Execution then ends.

If the type of message is an accounting response, then at step 516, the proxy server message keep the proxy server then may forward the message intact o another entity. Execution then ends.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

It will be apparent to those of ordinary skill in the art that methods involved in the system and method for determining the address of a home agent may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A method of transmitting data between a mobile node and a home agent for the mobile node, the mobile node having an associated authentication server, the method comprising:
    establishing a first communication between a first packet data serving node (PDSN) and the mobile node located in a first network;
    determining at a proxy server an address of the authentication server;
    contacting the authentication server and, responsively, receiving information from which an address of the home agent for the mobile node may be determined;
    determining the address of the home agent using the information received from the authentication server;
    sending the address of the home agent from the proxy server to the first PDSN;
    sending, from the authentication server to the proxy server, a methodology for determining a home address for the mobile node;
    using, at the proxy server, the methodology to determine the home address for the mobile node;
    sending the home address for the mobile node from the proxy server to the first PDSN;
    sending, from the first PDSN to the home agent at the address of the home agent, a first registration request message for establishing a first registration between the first PDSN and the home agent;
    routing the data from the mobile node to the home agent via the first PDSN.

2. The method of claim 1 further comprising:
    moving the mobile node to a second network, wherein the second network comprises a second PDSN;
    establishing a second communication between the mobile node and the second PDSN;
    re-determining at the proxy server the address of the authentication server for the mobile node;
    re-contacting the authentication server and, responsively, receiving information from which the address of the home agent for the mobile node may be determined;
    re-determining the address of the home agent;
    sending the address of the home agent from the proxy server to the second PDSN;
    sending, from the second PDSN to the home agent at the address of the home agent, a second registration request message for establishing a second registration between the second PDSN and the home agent; and
    re-routing data from the mobile node to the home agent via the second PDSN.

3. The method of claim 2, further comprising:
    sending a resource reclaim message to the first PDSN from the proxy server;
    sending a de-registration request message from the first PDSN to the home agent for the removal of active connection information at the home agent.

4. The method of claim 1, wherein the methodology comprises the authentication server sending the home address for the mobile node to the proxy server.

5. The method of claim 1, wherein the methodology comprises the proxy server selecting the home address for the mobile node from a pool of addresses stored in the proxy server.

6. The system of claim 1, wherein the information indicates that the proxy server should assign the home agent address.

7. The system of claim 1, wherein the information comprises the authentication server providing a value of the home agent address to the proxy server.

8. A system comprising:
    a mobile node;
    a wireless network coupled to the mobile node;
    a packet data serving node (PDSN) coupled to the wireless network;
    a proxy server coupled to the PDSN, the proxy server including a table comprising an address pool;
    an authentication server coupled to the proxy server; and
    a home agent coupled to the PDSN;
    wherein the mobile node sends a access-request message to the wireless network, and the wireless network sends the access-request message to the PDSN;
    wherein the PDSN forwards the access-request message to the proxy server;
    wherein the proxy server determines the address of the authentication server;
    wherein the authentication server receives the access-request message from the proxy server and, responsively, sends the proxy server information indicating (i) a first methodology of determining an address of the home agent, and (ii) a second methodology of determining a home address of the mobile node;
    wherein the proxy server determines the address of the home agent using the first methodology and determines the home address of the mobile node using the second methodology;
    wherein the proxy server sends the address of the home agent address and the home address of the mobile node to the PDSN; and
    wherein a data message from the mobile node is thereafter forwarded to the home agent via the PDSN.

9. The system of claim 8 wherein the second methodology comprises determining the home address of the mobile node statically.

10. The system of claim 8 wherein the second methodology comprises determining the home address of the mobile node dynamically.

11. The system of claim 8 wherein the second methodology comprises determining the home address of the mobile node from the address pool.

12. The system of claim 8 wherein the network includes a PDSN.

13. The system of claim 8 wherein said mobile node subsequently moves to a second network and the address of the authentication server, the mobile node, and the home agent are re-determined.

14. The system of claim 8, wherein the PDSN sends the home address of the mobile node to the mobile node.

15. The system of claim 8, wherein the data message is forwarded by routing the data message.

16. The system of claim 8, wherein the data message is forwarded by tunneling the data message.

17. The system of claim 8, wherein the first methodology comprises the proxy server assigning the home agent address.

18. The system of claim 8, wherein the first methodology comprises the authentication server providing a value of the home agent address to the proxy server.

* * * * *